US010394390B2

(12) United States Patent
Xu et al.

(10) Patent No.: US 10,394,390 B2
(45) Date of Patent: Aug. 27, 2019

(54) TOUCH SCREEN, TOUCH DISPLAY DEVICE AND TOUCH DETECTION METHOD

(71) Applicants: BOE TECHNOLOGY GROUP CO., LTD., Beijing (CN); HEFEI BOE OPTOELECTRONICS TECHNOLOGY CO., LTD., Hefei, Anhui (CN)

(72) Inventors: Jun Xu, Beijing (CN); Qing Zhang, Beijing (CN); Jing Huang, Beijing (CN)

(73) Assignees: BOE TECHNOLOGY GROUP CO., LTD., Beijing (CN); HEFEI BOE OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 0 days.

(21) Appl. No.: 15/681,223

(22) Filed: Aug. 18, 2017

(65) Prior Publication Data
US 2018/0074655 A1  Mar. 15, 2018

(30) Foreign Application Priority Data
Sep. 12, 2016  (CN) .......................... 2016 1 0824585

(51) Int. Cl.
G06F 3/03 (2006.01)
G06F 3/042 (2006.01)
F21V 8/00 (2006.01)
G06F 3/041 (2006.01)

(52) U.S. Cl.
CPC .......... *G06F 3/0428* (2013.01); *G02B 6/0023* (2013.01); *G06F 3/0416* (2013.01); *G06F 2203/04104* (2013.01); *G06F 2203/04109* (2013.01)

(58) Field of Classification Search
CPC ......... G02B 6/0023; G06F 2203/04104; G06F 2203/04109; G06F 3/0416; G06F 3/0428
USPC .................................................. 345/170–176
See application file for complete search history.

(56) References Cited

U.S. PATENT DOCUMENTS

| 2006/0279558 | A1* | 12/2006 | Van Delden | G02F 1/13338 345/176 |
| 2009/0027357 | A1* | 1/2009 | Morrison | G06F 3/0421 345/175 |
| 2012/0169669 | A1* | 7/2012 | Lee | H04N 5/2254 345/175 |
| 2012/0327039 | A1* | 12/2012 | Kukulj | G06F 3/0421 345/175 |
| 2013/0127790 | A1* | 5/2013 | Wassvik | G06F 3/042 345/175 |

(Continued)

Primary Examiner — Tony O Davis
(74) Attorney, Agent, or Firm — Kinney & Lange, P.A.

(57) ABSTRACT

A touch screen, a touch display device and a touch detection method are provided in the embodiments of the disclosure. In one embodiment, the touch screen includes a light guide element; a light source which is provided on a side of the light guide element to face inside of the light guide element, and configured to emit light towards the light guide element so as to be guided into the light guide element; and a plurality of detectors which are provided on at least one side of the light guide element to face inside of the light guide element, and configured to receive light from corresponding sides of the light guide element where the light exits, respectively.

20 Claims, 4 Drawing Sheets

(56) References Cited

U.S. PATENT DOCUMENTS

| | | | | |
|---|---|---|---|---|
| 2013/0265245 A1* | 10/2013 | Chou | ............... | G06F 3/0421 345/173 |
| 2013/0314379 A1* | 11/2013 | Tsai | ............ | G06F 3/042 345/175 |
| 2015/0346856 A1* | 12/2015 | Wassvik | ............ | G06F 3/042 345/175 |
| 2016/0246446 A1* | 8/2016 | Osborne | ............ | G06F 3/0421 |

* cited by examiner

TOUCH SCREEN, TOUCH DISPLAY DEVICE AND TOUCH DETECTION METHOD

CROSS-REFERENCE TO RELATED APPLICATION

The present disclosure claims the benefit of Chinese Patent Application Invention No. 201610824585.8 filed on Sep. 12, 2016 in the State Intellectual Property Office of China, the whole disclosure of which is incorporated herein by reference.

BACKGROUND

Field of the Invention

Embodiments of the present disclosure relate to the technical field of the touch technology, and especially to a touch screen, a touch display device and a touch detection method.

Description of the Related Art

As the multimedia technology develops, touch technology is increasingly becoming one of the hot focuses in human-computer interaction nowadays. Conventional human-computer interaction ways in many products, such as a keyboard, a mouse and so on, are replaced by touch technology gradually. In many touch technologies, an infrared touch screen is widely used in multiple occasions, since it has some intrinsic advantages, such as, being not susceptible to current, voltage and electrostatic interference and thus being applicable for harsh environments.

SUMMARY

The embodiments of the present disclosure provide a touch screen, a touch display device and a touch detection method, so as to implement a multi-point touch or a multi touch, without an existence of any ghost point.

According to an aspect of the exemplary embodiment of the present disclosure, there is provided a touch screen, comprising: a light guide element; a light source which is provided on a side of the light guide element to face inside of the light guide element, and configured to emit light towards the light guide element so as to be guided into the light guide element; and a plurality of detectors which are provided on at least one side of the light guide element to face inside of the light guide element, and configured to receive light from corresponding sides of the light guide element where the light exits respectively.

In an embodiment of the disclosure, the light guided into the light guide element propagates therethrough by total reflection therein, so as to form a light field in the light guide element, and in case that there exists at least one touch point at a touch surface of the light guide element which intersects each side thereof, a total reflection condition is destroyed at the at least one touch point such that at least one portion of the light escapes from the at least one touch point and thus the light field at the at least one touch point is varied.

In an embodiment of the disclosure, the light source is a point light source.

In an embodiment of the disclosure, the touch screen further comprises a light expansion element provided between the light source and the light guide element.

In an embodiment of the disclosure, the light source is one of an infrared light source and a near-infrared light source, and the plurality of detectors is of a type of one of an infrared detector and a near-infrared detector.

In an embodiment of the disclosure, the light guide element is a rectangular light guide element.

In an embodiment of the disclosure, the plurality of detectors is provided on sides of the light guide element on which the light source is not located.

In an embodiment of the disclosure, the plurality of detectors is provided at all sides of the light guide element.

In an embodiment of the disclosure, the light guide element is one of a planar light guide element and a curved light guide element.

In an embodiment of the disclosure, the light guide element is formed by one of glass material and polymer material.

According to another aspect of the exemplary embodiment of the present disclosure, there is provided a touch display device, comprising a display panel and the touch screen as above, and the touch screen is provided at a display side of the display panel.

According to yet another aspect of the exemplary embodiment of the present disclosure, there is provided touch detection method for the touch screen as above, comprising: acquiring an initial value of detection of each of the plurality of detectors and optical information of the light source; acquiring an initial distribution of a light field in the light guide element depending on the initial value of detection and the optical information; acquiring a present value of detection of each of the plurality of detectors; acquiring a present distribution of the light field in the light guide element depending on the present value of detection and the optical information; and determining whether there exists a touch point depending on the initial distribution and the present distribution of the light field, and acquiring a position of the touch point in case that it is determined that there exists a touch point.

In an embodiment of the disclosure, determining whether there exists a touch point depending on the initial distribution and the present distribution of the light field comprising: comparing the present distribution of the light field with the initial distribution of the light field so as to determine variations of the light field throughout the light guide element; and determining that there is a touch point where a variation of the light field is larger than a variation threshold of the light field in case that there is a position in which the variation of the light field is larger than the variation threshold of the light field.

In an embodiment of the disclosure, acquiring an initial distribution of a light field in the light guide element depending on the initial value of detection and the optical information comprises: acquiring the initial distribution of the light field in the light guide element by one of a finite element method and a boundary element method depending on the initial value of detection and the optical information; and acquiring a present distribution of the light field in the light guide element depending on the present value of detection and the optical information comprises: acquiring the present distribution of the light field in the light guide element by one of a finite element method and a boundary element method depending on the present value of detection and the optical information.

In an embodiment of the disclosure, each of the initial value of detection and the present value of detection comprises one of a luminous flux, a light intensity and a photon density of the light exiting from corresponding sides of the light guide element where the light exits respectively, which are detected by the plurality of detectors; and the optical information of the light source comprises one of a luminous flux, light intensity and a photon density of the light source.

In an embodiment of the disclosure, the initial distribution of the light field is represented by one of initial distributions of the luminous flux, the light intensity and the photon density inside the light guide element; and the present distribution of the light field is represented by one of present distributions of the luminous flux, the light intensity and the photon density inside the light guide element.

In an embodiment of the disclosure, the initial distribution and the present distribution of the light field are represented by initial and present distributions of the photon density inside the light guide element, respectively; acquiring an initial distribution of a light field in the light guide element depending on the initial value of detection and the optical information comprises: acquiring the initial distribution of the photon density inside the light guide element by one of a finite element method and a boundary element method depending on the initial value of detection and the optical information; acquiring a present distribution of the light field in the light guide element depending on the present value of detection and the optical information comprises: acquiring the present distribution of the photon density inside the light guide element by one of a finite element method and a boundary element method depending on the present value of detection and the optical information; determining whether there exists a touch point depending on the initial distribution and the present distribution of the light field comprises: acquiring initial and present distributions of absorption coefficient inside the light guide element depending on the initial and present distributions of the photon density inside the light guide element respectively; and whether there exists a touch point is determined depending on the initial and present distributions of absorption coefficient.

In an embodiment of the disclosure, acquiring initial and present distributions of absorption coefficient inside the light guide element depending on the initial and present distributions of the photon density inside the light guide element respectively comprises: acquiring initial and present distributions of absorption coefficient respectively by a following equation on a basis of a particular boundary condition:

$$-\nabla \cdot \kappa(\vec{r}) \cdot \nabla \Phi(\vec{r}) + \mu_a(\vec{r}) \cdot \Phi(\vec{r}) = q(\vec{r})$$

as herein, $\Phi(\vec{r})$ is a photon density at a position of $\vec{r}$, $\mu_a(\vec{r})$ is an absorption coefficient at a position of $\vec{r}$, $q(\vec{r})$ is a light source item and $\kappa(\vec{r})$ is a diffusion coefficient which is defined by:

$$\kappa(\vec{r}) = \frac{1}{3(\mu_a(\vec{r}))}.$$

In an embodiment of the disclosure, the particular boundary condition comprises a first boundary condition which is applied on a touch surface of the light guide element which intersects each side thereof and a surface opposite to the touch surface, and a Robin boundary condition which is applied on sides of the light guide element.

In an embodiment of the disclosure, determining whether there exists a touch point depending on the initial and present distributions of absorption coefficient comprises: determining whether there is a difference value between the present and initial values of absorption coefficient throughout the light guide element which is larger than a threshold value of absorption coefficient difference; and if yes, determining that there exists a touch point at a position where the difference value is larger than the threshold value of absorption coefficient difference.

In an embodiment of the disclosure, the initial distribution of the light field is equivalent to a distribution of the light field due to a propagation of the light from the light source inside the light guide element by total reflection in case that there exists no touch point; and the present distribution of the light field is equivalent to a distribution of the light field due to a light leakage resulting from a violation of a condition of total reflection at a position of a touch point in case that it is determined that there exists the touch point.

BRIEF DESCRIPTION OF THE DRAWINGS

The above and other features and advantages of the present disclosure will become more apparent and a more comprehensive understanding of the present disclosure can be obtained, by describing in detail exemplary embodiments thereof with reference to the accompanying drawings, in which.

Identical reference numerals are applied to refer to same or corresponding components or features, throughout the drawings.

DETAILED DESCRIPTION OF EMBODIMENTS OF THE DISCLOSURE

Figure 1:
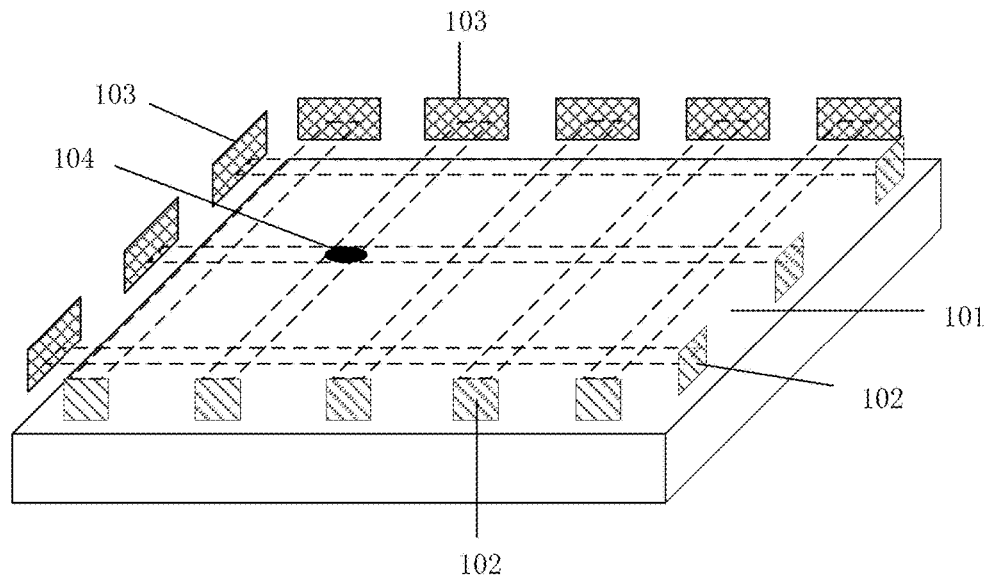
FIG. 1 illustrates exemplarily a structural perspective view of an exemplary infrared touch screen.

Exemplary embodiments of the present disclosure will be described hereinafter in detail with reference to the attached drawings, wherein the like reference numerals refer to the like elements. The present disclosure may, however, be embodied in many different forms, and thus the detailed description of the embodiment of the disclosure in view of attached drawings should not be construed as being limited to the embodiment set forth herein; rather, these embodiments are provided so that the present disclosure will be thorough and complete, and will fully convey the general concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Respective dimension and shape of each component in the drawings are only intended to exemplarily illustrate the contents of the disclosure, rather than to demonstrate the practical dimension or proportion of components of the touch screen and the touch display device.

Figure 2:
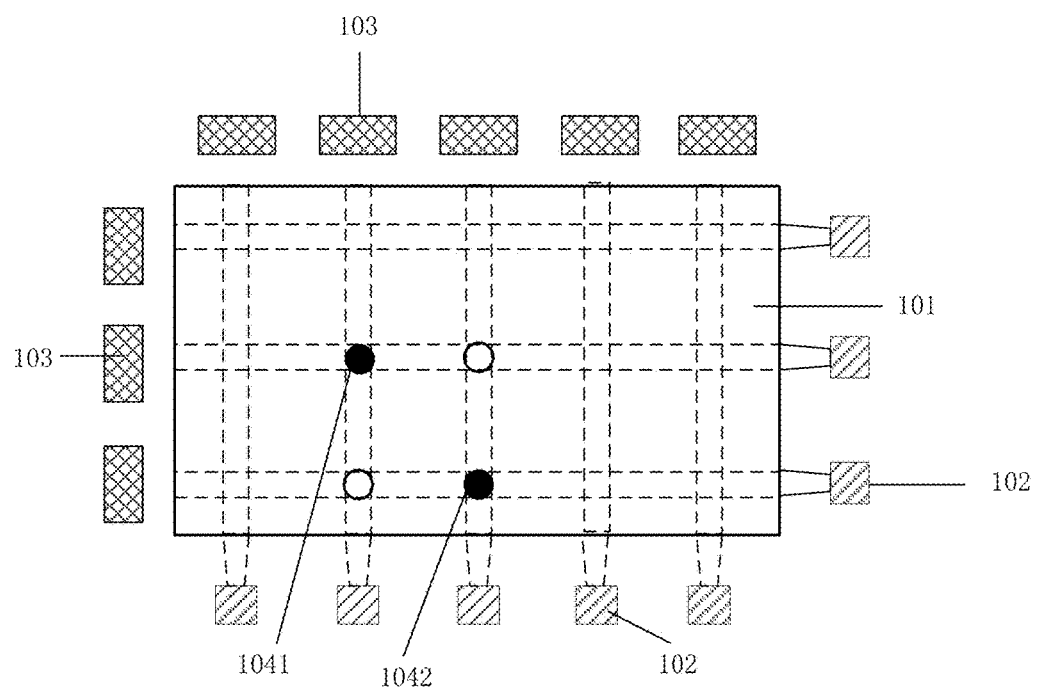
FIG. 2 illustrates exemplarily a top view of the infrared touch screen as illustrated in FIG. 1.

FIG. 1 illustrates exemplarily a structural perspective view of an exemplary infrared touch screen; and FIG. 2 illustrates exemplarily a top view of the infrared touch screen as illustrated in FIG. 1. As illustrated in FIGS. 1 and 2, an exemplarily infrared touch screen typically comprises infrared emitting elements 102 and infrared receiving elements 103 both of which are arranged around a touch detection region 101, and are provided opposite to each other in a one-to-one relationship. An infrared light is emitted by the infrared emitting elements 102 and received by the infrared receiving elements 103, so as to form an infrared grid network which is densely distributed above the touch detection region (i.e., a touch surface) 101 in both X and Y directions. A touch point 104 within the touch detection region 101 may be detected by detecting a shading condition for a light ray between the infrared emitting elements 102 and the infrared receiving elements 103. However, in case that there are a plurality of touch points within the touch detection region 103, ghost points may tend to be generated on the infrared touch screen. As illustrated in FIG. 2, in case that there are two touch points 1041, 1042, four touch points may be detected on a basis of the shading condition for a light ray in which two are true touch points while another two are ghost points, i.e., false touch points. Then, a further special processing is required so as to determine true touch points; as such, a misjudgment may easily be incurred.

According to an exemplary embodiment of the disclosure, in an aspect of the disclosure, a touch screen is provided, comprising a light guide element; a light source which is provided on a side of the light guide element to face inside of the light guide element, and configured to emit light towards the light guide element so as to be guided into the light guide element; and a plurality of detectors which are provided on at least one side of the light guide element to face inside of the light guide element, and configured to receive light from corresponding sides of the light guide element where the light exits respectively.

In the touch screen provided by the disclosure, the light emitted by the light source is guided into the light guide element and propagates therein, e.g., by a total reflection, so as to form a stable light field within the light guide element. Once a user touches the touch surface which intersects all sides of the light guide element, a touch point is created, media on both sides of the touch surface of the light guide element change and then a distribution of the light field within the light guide element may be influenced; and a specific position of the touch point may in turn be determined depending on the change of the light filed throughout the light guide element. Since the touch screen provided by the disclosure may implement the touch detection on a basis of the distribution of the light field, rather than on the basis of the detection of the shading condition for a light ray between the infrared emitting elements and infrared receiving elements, then a multi-point touch may be implemented, without an existence of any ghost point. In addition, since both the light source and the plurality of detectors are provided facing the sides of the light guide element, in a same thickness space as that in which the light guide element is located without occupying an additional thickness space, an overall thickness of the touch screen is decreased. Once again, since the touch screen provided by the disclosure may implements the touch point detection on the basis of the distribution of the light field within the light guide element, then, in case that the light guide element is a curved light guide element, the touch screen provided by the disclosure may also be applicable to a curved touch display so as to implement a curved display thereby.

Figure 3:
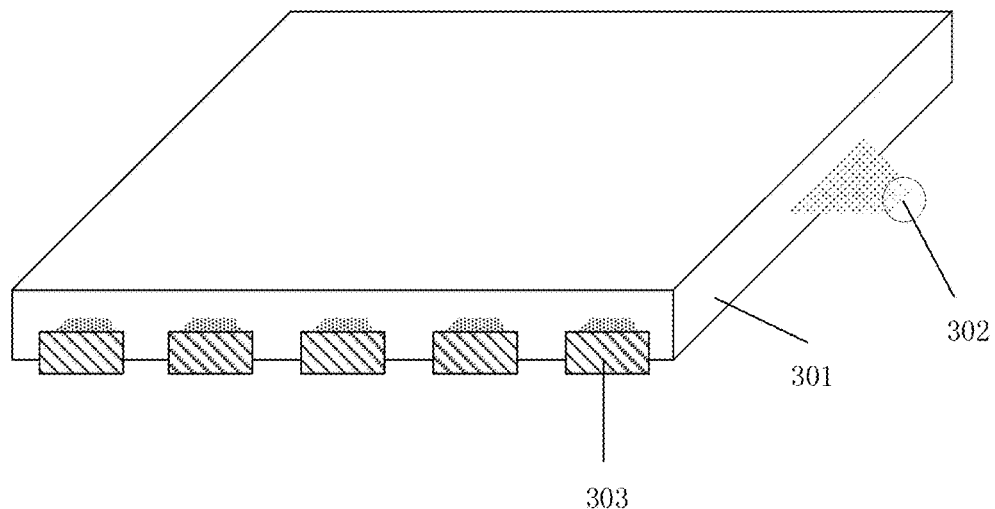
FIG. 3 illustrates exemplarily a structural perspective view of a touch screen provided by an exemplary embodiment of the disclosure.
Figure 4:
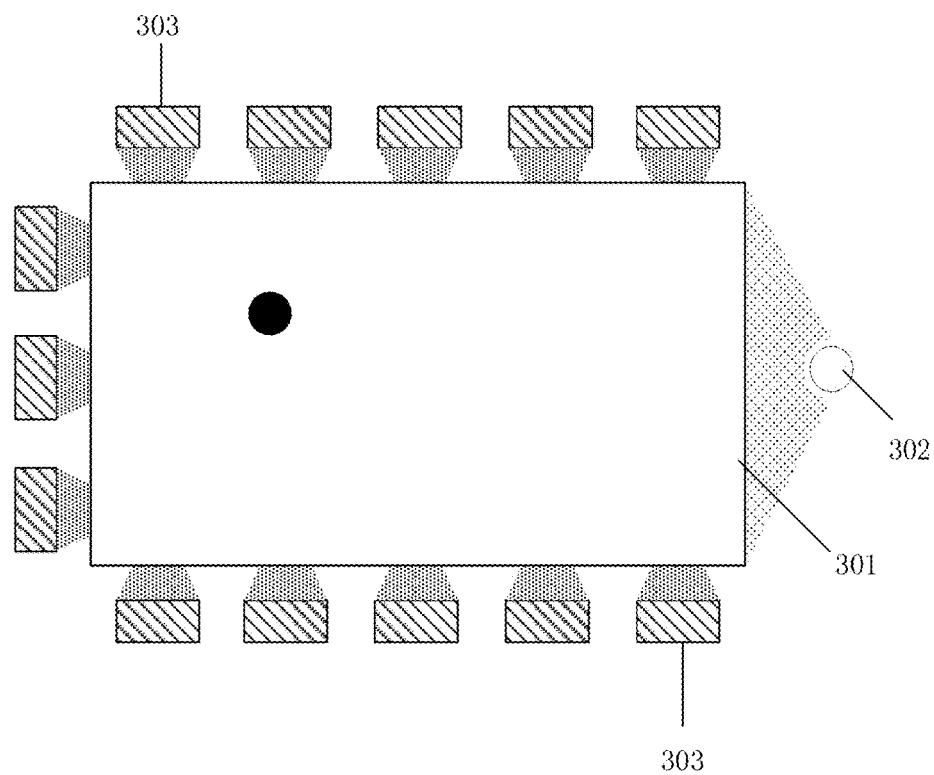
FIG. 4 illustrates exemplarily a top view of the touch screen as illustrated in FIG. 3.

FIG. 3 illustrates exemplarily a structural perspective view of a touch screen provided by an exemplary embodiment of the disclosure; and FIG. 4 illustrates exemplarily a top view of the touch screen as illustrated in FIG. 3. As illustrated in FIGS. 3 and 4, the touch screen comprises a light guide element 301; a light source 302 which is provided on a side of the light guide element 301 to face inside of the light guide element 301, and configured to emit light towards the light guide element 301 so as to be guided therein; and a plurality of detectors 303 provided on other sides of the light guide element 301 on which the light source 302 is not located to face inside of the light guide element 301, and configured to receive light from corresponding sides of the light guide element 301 where the light exits respectively.

Figure 5A:
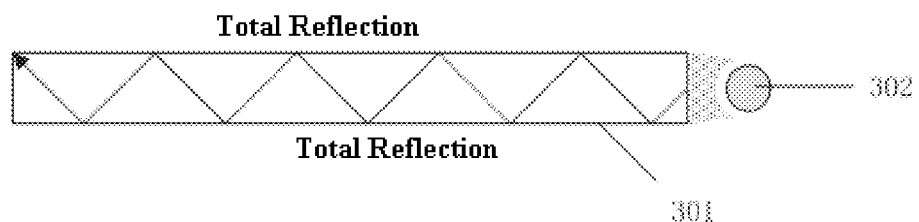
FIG. 5a illustrates exemplarily a schematic view of a total reflection of a light inside a light guide element, without any touch point.
Figure 5B:
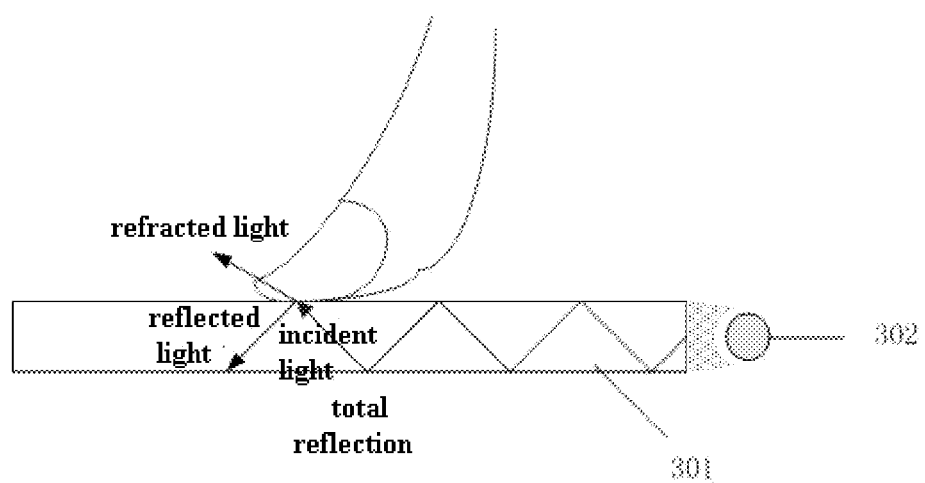
FIG. 5b illustrates exemplarily a schematic view of a violation of a condition of total reflection due to a touch action.

In an embodiment of the disclosure, the light source 302 is provided on a side of the light guide element 301, with a light emitted therefrom being projected and propagating inside of the light guide element 301 in total reflection, as illustrated in FIG. 5a, so as to form a stable light field within the light guide element 301. Once the user touches the touch surface on the light guide element 301, which intersects all sides of the light guide element 301, a touch point is created, media on the touch surface of the light guide element change so as to destroy the condition of total reflection; therefore, light escapes from and exits the touch surface of the light guide element 301 by an outward refraction therefrom, as illustrated in FIG. 5b, resulting in a change of the light field inside of the light guide element 301, especially in a vicinity of the touch surface of the light guide element. As such, the position of the touch point may in turn be determined depending on the detection of the change of the light filed inside of the light guide element.

In the touch screen provided by the embodiment of the disclosure, the light emitted by the light source is restricted inside of the light guide element, without any additional thickness space being occupied by the light source and the detectors, so as to decrease a thickness of the touch screen. As such, the touch screen may implement a functionality of touch by relatively less components and thus a relative low cost as compared with a traditional touch screen, without component thereof being densely distributed around the touch detection region; and the touch point may be detected on the basis of the distribution of the light field, rather than on the basis of the shading condition for a light ray, then ghost points may not be produced in case of multiple touch points existing there. Upon an identification of touch, by way of example, the distribution of the light filed inside the light guide element may be deduced by a finite element method and a boundary element method depending on the value of detection by each of detectors and the optical information, and a resolution may be enhanced by a fine subdivision of the touch surface of the light guide element, i.e., the touch detection region without increasing numbers of the components or devices therein, resulting in a relatively low marginal cost of the touch screen, i.e., an additional cost which is required to be increased as the resolution is increased by a certain amount.

It should be noticed that, in the embodiment as illustrated in FIG. 3, the light guide element is a rectangular light guide element, e.g., the rectangular light guide element is a rectangular optical waveguide; and in the embodiment, the plurality of detectors are provided respectively on three sides of the light guide element on which the light source is not located. However, it is to be noticed that, irrespective of accuracy of detection, by way of example, the plurality of detectors are provided at one or two sides of the light guide element. For the purpose of improving the accuracy, the plurality of detectors may also be provided at all sides of the light guide element, e.g., typically four sides thereof.

In an embodiment of the disclosure, by way of example, the light source is a point light source. In order to ensure that the light emitted by the light source may spread over the whole light guide element, a light expansion element is provided between the light source and the light guide element, e.g., a beam expanding prism, a beam expanding lens.

In an embodiment of the disclosure, by way of example, the light source is one of an infrared light source and a near-infrared light source; and correspondingly, the plurality of detectors are of a type of one of an infrared detector and a near-infrared detector.

In an embodiment of the disclosure, by way of example, the light guide element is one of a planar light guide element and a curved light guide element, and is formed by one of glass material and polymer material. In case that the light guide element is a curved light guide element, the touch screen provided by the disclosure is for example applicable to fabrication of a curved touch display so as to implement a curved display and a functionality of touch simultaneously.

In another aspect of the disclosure, a touch display device is provided, which comprises a display panel and the touch screen as depicted in the embodiments of the disclosure. The touch screen is provided at a display side of the display panel. The touch display device provided by the disclosure has a relatively low cost and a relative thin thickness, and fails to generate any ghost point thereon in case of multiple touch points exiting thereon.

In yet another aspect of the disclosure, a touch detection method for the touch screen is further provided, which method is applicable to the touch screen as depicted herein. The touch detection method of the disclosure is set forth in detail with reference to the drawings and specific embodiments relating thereto.

Figure 6:
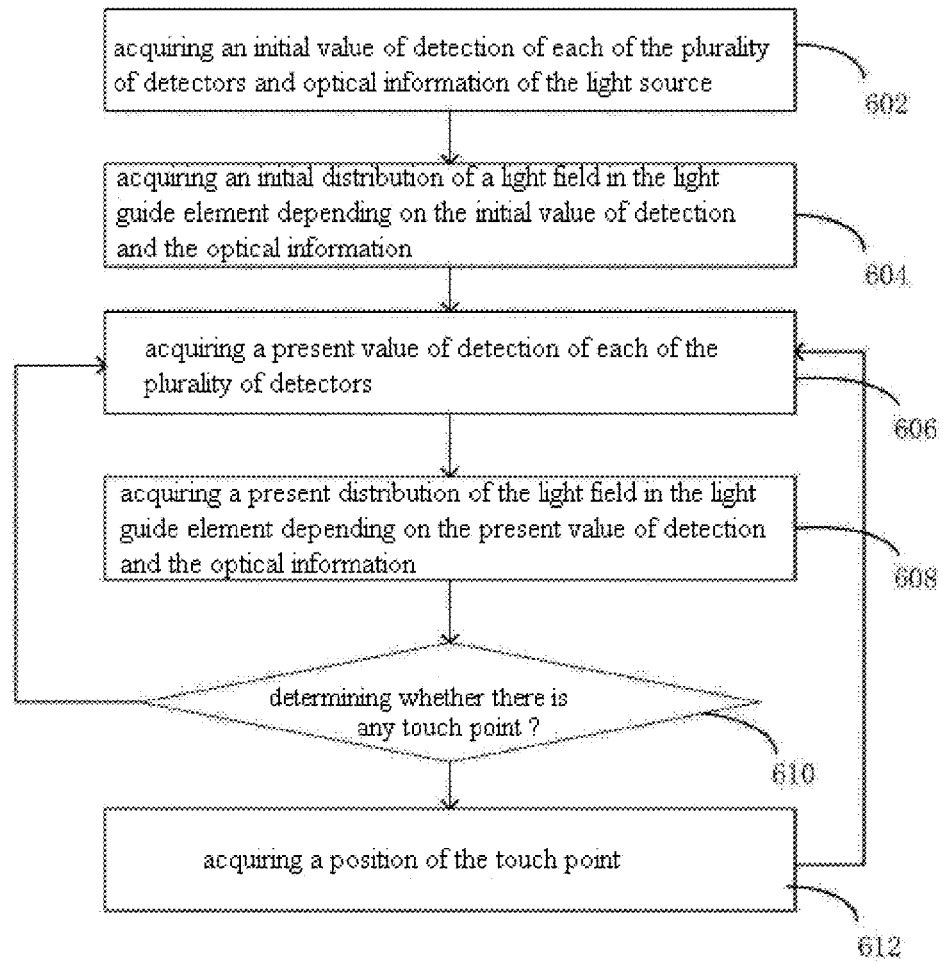
FIG. 6 illustrates exemplarily a flow chart of a touch detection method, according to an exemplary embodiment of the disclosure.

FIG. 6 illustrates exemplarily a flow chart of a touch detection method, according to an exemplary embodiment of the disclosure. As illustrated in FIG. 6, the touch detection method comprises following steps:

S602: acquiring an initial value of detection of each of the plurality of detectors and optical information of the light source;

S604: acquiring an initial distribution of a light field in the light guide element depending on the initial value of detection and the optical information of the light source;

S606: acquiring a present value of detection of each of the plurality of detectors;

S608: acquiring a present distribution of the light field in the light guide element depending on the present value of detection and the optical information of the light source; and S610: determining whether there exists a touch point depending on the initial distribution and the present distribution of the light field: if yes, entering Step S612; if no, returning back to Step S606 so as to perform another period of detection;

S612: acquiring a position of the touch point, and returning back to step S606 to perform another period of detection.

In an embodiment of the disclosure, by way of example, each of the initial value of detection and the present value of detection comprises one of a luminous flux, a light intensity and a photon density of the light exiting from corresponding sides of the light guide element where the light exits respectively, which are detected by each of the plurality of detectors; and the optical information of the light source comprises one of a luminous flux, light intensity and a photon density of the light source. Correspondingly, the initial distribution of the light field is represented by one of initial distributions of the luminous flux, the light intensity and the photon density inside the light guide element, for example; and the present distribution of the light field is represented by one of present distributions of the luminous flux, the light intensity and the photon density inside the light guide element, for example.

For facilitating depiction, in the embodiment, taking a case in which the initial and the present values of the photon density detected by the each of the detectors function as the initial and the present values of detection respectively for example, the optical information of the light source is correspondingly the photon density of the light source, then the initial distribution and the present distribution of the light field are represented by initial and present distributions of the photon density inside the light guide element, respectively. It may be noticed that, depending on optical parameters which are practically detected by the detectors, such as the luminous flux, the light intensity and the like, then the optical information of the light source, the initial distribution and the present distribution of the light field may alternatively or additionally be represented by other optical parameters correspondingly, such as the luminous flux, the light intensity and the like. In such a condition, the touch point may be detected similarly by the touch detection method provided in the disclosure.

In the step S602, once the touch screen is turned on, a total reflection of the light emitted by the light source occurs initially inside the light guide element, so as to form a stable light field. Each of the detectors located on a side of the light guide element may for example detect the initial values of the photon density of the light field on sides of the light guide element where the light exits, i.e., values of the photon density in case that there is no touch point on the touch surface of the light guide element, as the initial values of detection by the detectors respectively.

In the step S604, by way of example, the initial distribution of a light field in the light guide element may be acquired by the finite element method or the boundary element method, depending on the optical information of the light source and the initial values of detection by the detectors. In an embodiment of the disclosure, the initial distribution of the light field corresponds to a distribution of the light field of the light emitted from the light source which propagates inside the light guide element by total reflection in case that there is no touch point.

Figure 7:
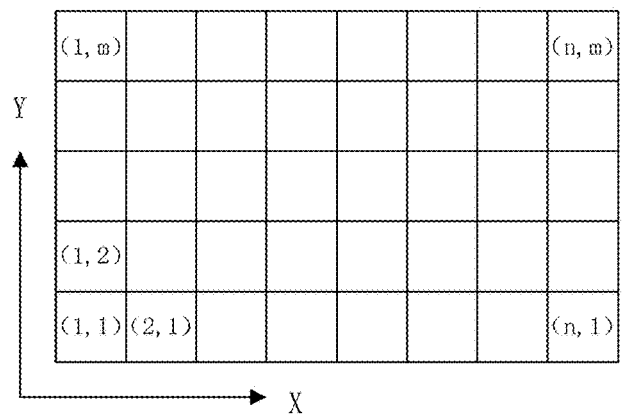
FIG. 7 illustrates exemplarily a schematic view of subdivisions of a touch surface of the light guide element.

During an operation process, by way of example, the light guide element is subdivided into a plurality of coordinate units which are presented by respective coordinates and arranged in an array as illustrated in FIG. 7. In the embodiment, for example, an initial distribution Φ(n, m) of the photon density inside the light guide element may be obtained by the finite element method or the boundary element method, e.g., on the basis of the optical information of the light source and the initial values of the photon density detected by the detectors respectively, wherein n and m refer to the coordinate values of the coordinate units thus subdivided, respectively.

The finite element method is an effective and common numerical computation method. In the finite element method, a continuous solution domain is discretized as a combination of a group of units, an assumed approximation function in each unit is applied in a segmented or fragmented way for representing an unknown field function to be solved in the solution domain. And the approximation function is typically represented by the unknown field function and a numerical interpolation function of its derivative at nodes of each unit. As such, a problem of continuous and infinite degrees of freedom may become a problem of discrete and finite degrees of freedom. And the boundary element method is another new numerical computation method developed following the finite element method. As compared with a principle idea of subdividing units in a continuum field in the finite element method, the boundary element method only subdivides units on a boundary of a domain of definition and approaches boundary conditions by a function which meets a control equation. Since both the finite element method and the boundary element method are numerical methods which are relatively well-developed, their specific solution procedures are not set forth in detail hereinafter in the embodiments of the disclosure.

In the step S606, by way of example, a plurality of sampling time points are provided at a prescribed time interval, and present photon density are obtained by detection of the detectors at each of the sampling time points, as the present value of detection by the detectors at the sampling time points.

In the step S608, similar to the step S604, by way of example, the present distribution of the light field in the light guide element is obtained by the finite element method or the boundary element method depending on the optical information of the light source and the present value of detection by each detector. In an embodiment of the disclosure, the present distribution of the light field is equivalent to a distribution of the light field due to a light leakage resulting from a violation of a condition of total reflection by application of a touch action at a position of a touch point in case that it is determined that there exists the touch point; and the present distribution of the light field is equivalent to a distribution of the light field due to a propagation of the light from the light source inside the light guide element by total reflection in case that there exists no touch point, i.e., at that time the present distribution of the light field is substantially the same as the initial distribution of the light field.

In a specific embodiment, by way of example, a present distribution $\Phi'(n, m)$ of the photon density inside the light guide element may be obtained by the finite element method or the boundary element method, e.g., on the basis of the optical information of the light source and the present values of the photon density detected by the detectors respectively, wherein n and m refer to the coordinates of the coordinate units thus subdivided respectively.

It should be noticed that, in an embodiment of the disclosure, a method for solving both the initial distribution and the present distribution of the light field is not limited to the finite element method or the boundary element method, and other alternative numerical method may for example be adopted.

In the step S610, by way of example, determining whether there exists a touch point depending on the initial distribution and the present distribution of the light field comprising: comparing the present distribution of the light field with the initial distribution of the light field so as to determine variations of the light field throughout the light guide element; and determining that there is a touch point where a variation of the light field is larger than a variation threshold of the light field in case that there is a position in which the variation of the light field is larger than the variation threshold of the light field.

In an embodiment of the disclosure, by way of example, the present distribution $\Phi'(n, m)$ of the photon density throughout the light guide element may be compared with the initial distribution $\Phi(n, m)$ of the photon density throughout the light guide element, so as to determine an absolute value of a variation of the photon density at each coordinate unit of the light guide element, i.e., $\Delta\Phi(n, m)=|\Phi'(n, m)-\Phi(n, m)|$, and to determine that there is a touch point at the coordinate unit (n, m) in case that $\Delta\Phi(n, m)$ is larger than a threshold $\Delta\Phi$ of a difference of photon density.

In another alternative embodiment, for example, a method as depicted below is adopted to determine whether there exists a touch point on the touch surface of the light guide element.

Firstly, initial and present distributions of absorption coefficient inside the light guide element are obtained respectively by a following equation depending on the initial distribution and the present distribution of the photon density inside the light guide element. In a specific embodiment, for example, initial and present distributions of absorption coefficient are obtained respectively by a following equation on a basis of a particular boundary condition $$-\nabla \cdot \kappa(\vec{r}) \cdot \nabla \Phi(\vec{r}) + \mu_a(\vec{r}) \cdot \Phi(\vec{r}) = q(\vec{r})$$

wherein $\vec{r}$ is a distance from the light source to a point on the light guide element and is a vector, $\Phi(\vec{r})$ is a photon density at a position of $\vec{r}$, $\mu_a(\vec{r})$ is an absorption coefficient at a position of $\vec{r}$, $\kappa(\vec{r})$ is a diffusion coefficient which is defined by an equation of $$\kappa(\vec{r}) = \frac{1}{3(\mu_a(\vec{r}))},$$

and $q(\vec{r})$ is a light source item which represents an influence of the light source on the position of $\vec{r}$, e.g., influences of the light source at the position of $\vec{r}$ on the photon density, the luminous flux and the light intensity, and the like.

In the embodiment, by way of example, the particular boundary condition may comprise a first boundary condition applied on a touch surface of the light guide element which intersects each side thereof and a surface opposite to the touch surface, and a Robin boundary condition applied on sides of the light guide element. To be specific, the first boundary condition provides a numerical value of the unknown function on the boundary while the Robin boundary condition provides a linear combination of a function value of the unknown function on the boundary and an exterior normal derivative thereof.

Therefore, on a basis of above equations, in case that the information $q(\vec{r})$ of the light source and the photon density at the detectors are known, the initial distribution $\mu_a(\vec{r})$ of absorption coefficient and present distribution $\mu'_a(\vec{r})$ of absorption coefficient are all solved throughout the light guide element. In order to facilitate processing of data, for example, both the initial distribution $\mu_a(\vec{r})$ of absorption coefficient and present distribution $\mu'_a(\vec{r})$ of absorption coefficient are discretized, so as to obtain discrete initial absorption coefficients $\mu_a(n, m)$ and discrete present absorption coefficients $\mu'_a(n, m)$.

Then, it is determined whether there exists a touch point depending on the initial and present distributions of absorption coefficient, and in case that it is determined that there exists a touch point indeed, the position of the touch point is obtained. Specifically, for example, it is determined whether there is a difference value between the present and initial values of absorption coefficient throughout the light guide element which is larger than a threshold value of absorption coefficient difference; and if yes, it is determined that there exists a touch point at a position where the difference value is larger than the threshold value of absorption coefficient difference.

It should be noticed that, in embodiments depicted herein, the touch point is detected on the basis of the initial distribution and the present distribution of the light field, by a variation therebetween; however, the disclosure is not limited hereto. By way of example, the touch detection method provided by the disclosure may further detect the touch point by other alternative methods on the basis of the initial distribution and the present distribution of the light field, such as a ratio therebetween, their square differences, or a ratio between their square differences, and the like.

In an embodiment of the disclosure, a total reflection of the light directed into the light guide element may occur on both upper and lower surfaces of the light guide element initially in case that there is no touch action applied externally, such that a stable light field is established inside the light guide element. In case that there is no touch object or finger touching the touch surface of the light guide element, the light field inside the light guide element substantially does not change; however, once there is a touch object or a finger touching the touch surface of the light guide element, media on the touch surface of the light guide element change and then a condition of total reflection is destroyed such that the light escapes and exits at the touch point and thus there is a change of the light field occurring at the touch point. Besides, in case that there may be a plurality of touch points, there may correspondingly be changes of the light field occurring at the plurality of touch points. Therefore, any of the plurality of the touch points may be detected by detection of changes of the light field inside the light guide element, without any ghost point. In addition, in a process of data processing, the resolution may be enhanced by a fine subdivision of the light guide element. The finer the subdivision is, the higher the resolution becomes.

Since a touch detection is for example implemented on a basis of the distribution of the light field inside the light guide element by the touch screen, the touch display device and the touch detection method as provided in the disclosure, without any detection of the shading condition for a light ray between an infrared emitting element and an infrared receiving element, a multi-point touch is thus implemented without forming any ghost point. Besides, since both the light source and the detectors are provided facing sides of the light guide element, in a same thickness space as that in which the light guide element is located without occupying an additional thickness space, an overall thickness of the touch screen is decreased. Once again, since the touch screen provided by the disclosure may implements the detection of the touch point on the basis of the distribution of the light field within the light guide element, then, in case that the light guide element is a curved light guide element, the touch screen provided by the disclosure may also be applicable to a curved touch display so as to implement a curved display thereby.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although the disclosure is described in view of the attached drawings, the embodiments disclosed in the drawings are only intended to illustrate the preferable embodiment of the present disclosure exemplarily, and should not be deemed as a restriction thereof.

Although several exemplary embodiments of the general concept of the present disclosure have been shown and described, it would be appreciated by those skilled in the art that various changes or modifications may be made in these embodiments without departing from the principles and spirit of the disclosure and lie within the scope of present application, which scope is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A touch screen, comprising:
   a light guide element;
   a light source which is provided on a side of the light guide element to face inside of the light guide element, and configured to emit light towards the light guide element so as to be guided into the light guide element; and
   a plurality of detectors which is provided on at least one side of the light guide element to face inside of the light guide element, and configured to receive light from corresponding sides of the light guide element where the light exits respectively;
   wherein the light guide element is a single integral light guide component formed by a material, having no other medium material contained therein of a different refractive index as compared with the material of the light guide component element.

2. The touch screen according to claim 1, wherein the light guided into the light guide element propagates therethrough by total reflection therein, so as to form a light field in the light guide element, and
   wherein in case that there exists at least one touch point at a touch surface of the light guide element which intersects each side thereof, a total reflection condition is destroyed at the at least one touch point such that at least one portion of the light escapes from the at least one touch point and thus the light field at the at least one touch point is varied.

3. The touch screen according to claim 2, wherein the touch screen further comprises a light expansion element provided between the light source and the light guide element.

4. The touch screen according to claim 1, wherein the light source is one of an infrared light source and a near-infrared light source, and
   wherein the plurality of detectors are of a type of one of an infrared detector and a near-infrared detector.

5. The touch screen according to claim 1, wherein the light guide element is a rectangular light guide element.

6. The touch screen according to claim 5, wherein the plurality of detectors is provided on sides of the light guide element on which the light source is not located.

7. The touch screen according to claim 5, wherein the plurality of detectors is provided at all sides of the light guide element.

8. The touch screen according to claim 1, wherein the light guide element is one of a planar light guide element and a curved light guide element.

9. The touch screen according to claim 1, wherein the light guide element is formed by one of glass material and polymer material.

10. A touch display device, comprising a display panel and the touch screen according to claim 1, wherein the touch screen is provided at a display side of the display panel.

11. A touch detection method for a touch screen, the touch screen comprising:
a light guide element;
a light source which is provided on a side of the light guide element to face inside of the light guide element, and configured to emit light towards the light guide element so as to be guided into the light guide element; and
a plurality of detectors which is provided on at least one side of the light guide element to face inside of the light guide element, and configured to receive light from corresponding sides of the light guide element where the light exits respectively;
the touch detection method comprising:
acquiring an initial value of detection of each of the plurality of detectors and optical information of the light source;
acquiring an initial distribution of a light field in the light guide element depending on the initial value of detection and the optical information;
acquiring a present value of detection of each of the plurality of detectors;
acquiring a present distribution of the light field in the light guide element depending on the present value of detection and the optical information; and
determining whether there exists a touch point depending on the initial distribution and the present distribution of the light field, and acquiring a position of the touch point in case that it is determined that there exists a touch point.

12. The touch detection method according to claim 11, wherein, determining whether there exists a touch point depending on the initial distribution and the present distribution of the light field comprising:
comparing the present distribution of the light field with the initial distribution of the light field so as to determine variations of the light field throughout the light guide element; and
determining that there is a touch point where a variation of the light field is larger than a variation threshold of the light field in case that there is a position in which the variation of the light field is larger than a variation threshold of the light field.

13. The touch detection method according to claim 11, wherein acquiring an initial distribution of a light field in the light guide element depending on the initial value of detection and the optical information comprises: acquiring the initial distribution of the light field in the light guide element by one of a finite element method and a boundary element method depending on the initial value of detection and the optical information; and wherein acquiring a present distribution of the light field in the light guide element depending on the present value of detection and the optical information comprises: acquiring the present distribution of the light field in the light guide element by one of a finite element method and a boundary element method depending on the present value of detection and the optical information.

14. The touch detection method according to claim 11, wherein each of the initial value of detection and the present value of detection comprises one of a luminous flux, a light intensity and a photon density of the light exiting from corresponding sides of the light guide element where the light exits respectively, which are detected by the plurality of detectors; and wherein the optical information of the light source comprises one of a luminous flux, light intensity and a photon density of the light source.

15. The touch detection method according to claim 14, wherein the initial distribution of the light field is represented by one of initial distributions of the luminous flux, the light intensity and the photon density inside the light guide element; and wherein the present distribution of the light field is represented by one of present distributions of the luminous flux, the light intensity and the photon density inside the light guide element.

16. The touch detection method according to claim 15, wherein the initial distribution and the present distribution of the light field are represented by initial and present distributions of the photon density inside the light guide element, respectively;

wherein acquiring an initial distribution of a light field in the light guide element depending on the initial value of detection and the optical information comprises: acquiring the initial distribution of the photon density inside the light guide element by one of a finite element method and a boundary element method depending on the initial value of detection and the optical information;

wherein acquiring a present distribution of the light field in the light guide element depending on the present value of detection and the optical information comprises: acquiring the present distribution of the photon density inside the light guide element by one of a finite element method and a boundary element method depending on the present value of detection and the optical information;

wherein determining whether there exists a touch point depending on the initial distribution and the present distribution of the light field comprises: acquiring initial and present distributions of absorption coefficient inside the light guide element depending on the initial and present distributions of the photon density inside the light guide element respectively; and wherein whether there exists a touch point is determined depending on the initial and present distributions of absorption coefficient.

17. The touch detection method according to claim 16, wherein acquiring initial and present distributions of absorption coefficient inside the light guide element depending on the initial and present distributions of the photon density inside the light guide element respectively comprises:

acquiring initial and present distributions of absorption coefficient respectively by a following equation on a basis of a boundary condition:

$$-\nabla \cdot \kappa(\vec{r}) \cdot \nabla \Phi(\vec{r}) + \mu_a(\vec{r}) \cdot \Phi(\vec{r}) = q(\vec{r})$$

wherein $\Phi(\vec{r})$ is a photon density at a position of $\vec{r}$, $\mu_a(\vec{r})$ is an absorption coefficient at a position of $\vec{r}$, $q(\vec{r})$ is a light source item and $\kappa(\vec{r})$ is a diffusion coefficient which is defined by:

$$K(\vec{r}) = \frac{1}{3(\mu_a(\vec{r}))}.$$

18. The touch detection method according to claim 17, wherein the boundary condition comprises a first boundary condition which is applied on a touch surface of the light guide element which intersects each side thereof and a surface opposite to the touch surface, and a Robin boundary condition which is applied on sides of the light guide element.

19. The touch detection method according to claim 16, wherein determining whether there exists a touch point depending on the initial and present distributions of absorption coefficient comprises: determining whether there is a difference value between the present and initial values of absorption coefficient throughout the light guide element which is larger than a threshold value of absorption coefficient difference; and when there is a difference value between the present and initial values of absorption coefficient throughout the light guide element which is larger than a threshold value of absorption coefficient difference, determining that there exists a touch point at a position where the difference value is larger than the threshold value of absorption coefficient difference.

20. The touch detection method according to claim 11, wherein the initial distribution of the light field is equivalent to a distribution of the light field due to a propagation of the light from the light source inside the light guide element by total reflection in case that there exists no touch point; and wherein the present distribution of the light field is equivalent to a distribution of the light field due to a light leakage resulting from a violation of a condition of total reflection at a position of a touch point in case that it is determined that there exists the touch point.

* * * * *